Figure 1:
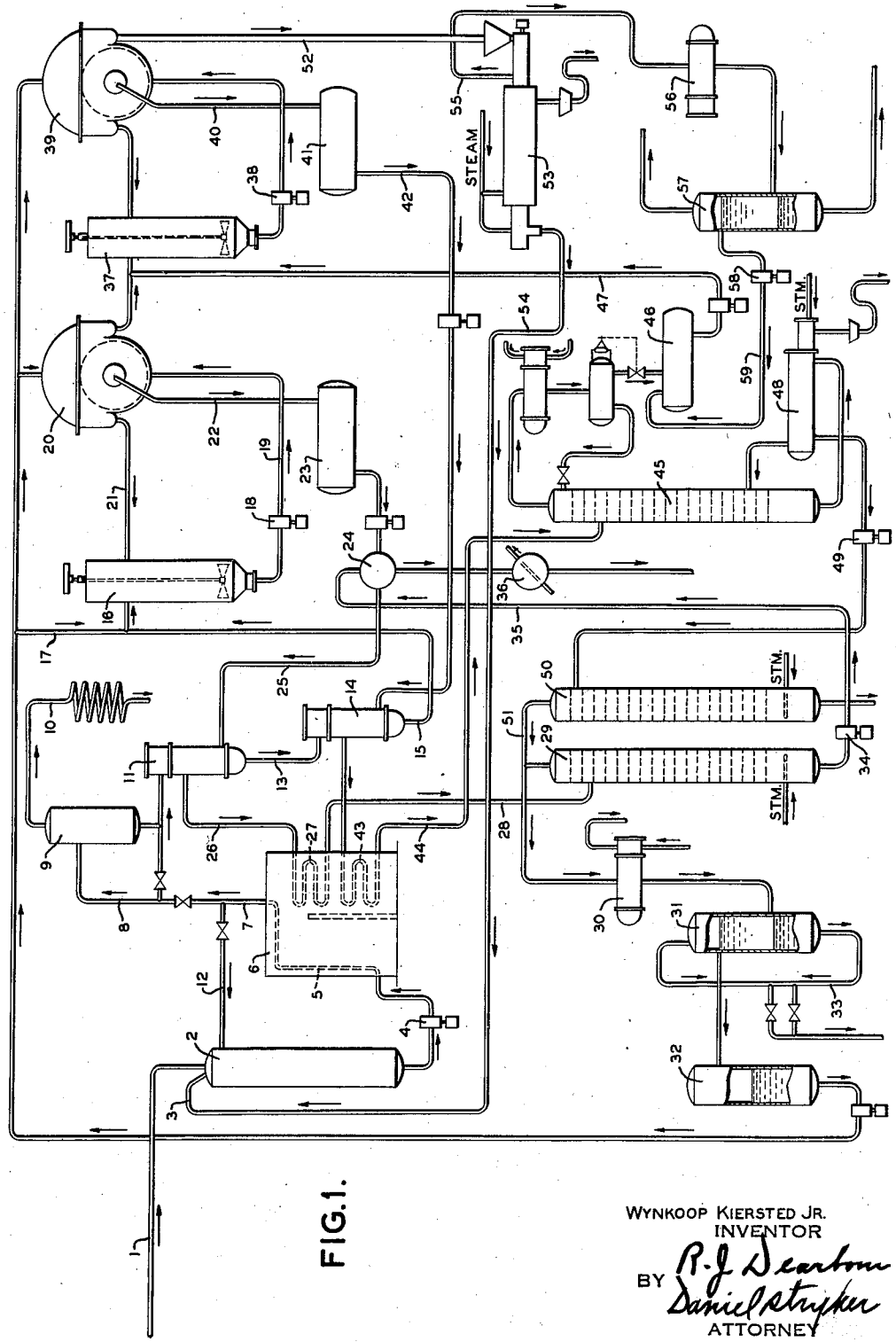

June 16, 1942. W. KIERSTED, JR 2,286,815
METHOD OF RECOVERING ADSORBENT MATERIALS
Filed Jan. 6, 1940 2 Sheets-Sheet 1

WYNKOOP KIERSTED JR.
INVENTOR
BY
ATTORNEY

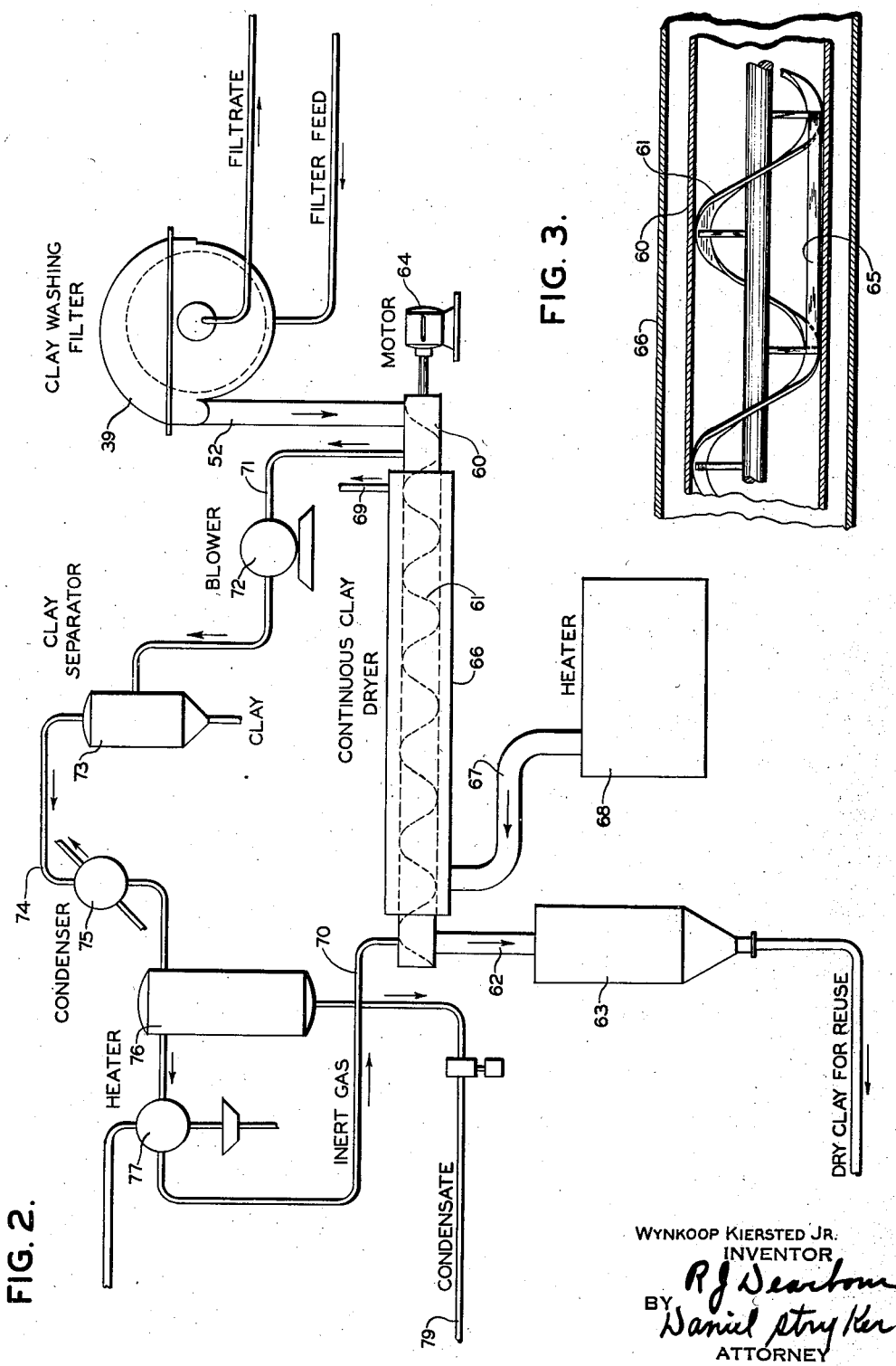

Patented June 16, 1942

2,286,815

UNITED STATES PATENT OFFICE 2,286,815

METHOD OF RECOVERING ADSORBENT MATERIALS

Wynkoop Kiersted, Jr., Scarsdale, N. Y., assignor, by mesne assignments, to The Texas Company, New York, N. Y., a corporation of Delaware Application January 6, 1940, Serial No. 312,667

1 Claim. (Cl. 252—277)

This invention relates to a method of and apparatus for recovering adsorbent materials and particularly to recovering and revivifying adsorbent materials, such as clay, used in the decolorizing treatment of hydrocarbon oils.

The invention broadly contemplates a process of removing coloring matter, oil, and other bodies adhering to or retained in solid decolorizing materials used in the treatment of hydrocarbon oils in order to revivify the decolorizing material substantially to its original decolorizing efficiency. More particularly, it concerns the removal of coloring matter and other impurities from earth or clay materials used in the treatment of oils such as derived from petroleum. The earth or clay materials in question may comprise fuller's earth, activated clays, acid-treated clays, or other silicious materials such as magnesium silicates, for example. It is contemplated that the process is applicable to other types of adsorbent materials which are used to remove coloring matter from oils by adsorption.

In accordance with the invention, the used adsorbent material containing coloring matter, as well as other impurities, including some oil absorbed during contact with hydrocarbon oil, is treated with a solvent, such as petroleum naphtha, capable of dissolving the retained oil. The solvent and dissolved oil are removed, leaving a substantially oil-free or deoiled adsorbent material. The deoiled material is then treated with a solvent, such as an aliphatic ketone, adapted to dissolve or displace the retained coloring matter. The solvent and dissolved matter are removed and the adsorbent material is then washed with a further quantity of solvent, such as naphtha, to remove or displace the retained color-removal solvent.

The washed clay, still retaining some naphtha and a small amount of color-removal solvent, is then subjected to drying at elevated temperature in a conveyor type of dryer wherein it is advantageously brought into direct contact with a stream of inert gas, such as steam or flue gas. The gas may be heated so as to supply the necessary heat and, at the same time, reduce the partial pressure of the retained solvents being removed from the clay, thereby facilitating their removal.

The invention is particularly applicable to the treatment of decolorizing clay such as used in the conventional clay contact treatment of mineral lubricating oils. The used clay contains a substantial amount of colorizing matter and also retains a substantial amount of oil; for example, the spent or used clay may contain around 40 or 60% of oil by weight of the clay. It is therefore desirable to deoil the clay as a preliminary to solvent extraction for the removal of the coloring matter. The present invention contemplates a continuous process for deoiling and extraction of the coloring matter from the clay in order to revivify and recondition the clay for reuse.

In order to describe the invention more fully, reference will now be made to the figures of the accompanying drawings illustrating a method of flow and arrangement of apparatus suitable for carrying out the invention.

Referring to Fig. 1, lubricating oil, such as a solvent extracted oil, is conducted from a source not shown and introduced through a pipe 1 to a vessel 2. Decolorizing clay recovered and revivified, as will be described later, is delivered through a pipe 3 to the vessel 2 and wherein it is mixed with the charge oil.

The mixture of oil and clay is drawn off from the bottom of the vessel 2 by a pump 4 and forced through a bank of coils 5 in a heater 6 wherein it is heated to a temperature suitable for the contact treatment. This temperature may be of the order of 400–500° F., for example, when a high viscosity oil such as a cylinder stock is being treated.

The hot oil and clay mixture is passed through a pipe 7 and branch pipe 8 to a flash drum 9 wherein any water vapor or solvent vapor present may be flashed off and removed from the system through a pipe 10.

From the bottom of the flash drum 9 the heated oil advantageously passes through a heat exchanger 11. As indicated, the heated mixture leaving the heater 6 through pipe 7 may pass directly to the exchanger 11, thus by-passing the flash drum 9. Also, a suitable proportion of the heated mixture may be recycled through a pipe 12 to the previously mentioned vessel 2. Such recycling imparts agitation to the contents of the vessel 2.

From the exchanger 11 the mixture of oil and clay passes through a pipe 13 to a second exchanger 14 and from there through pipe 15 to a vessel 16 provided with agitating means.

If it is desired to reduce the viscosity of the mixture at this point, a suitable quantity of naphtha may be introduced to the vessel 16 through a pipe 17.

From the vessel 16 the clay-oil mixture is forced by pump 18 through a pipe 19 to the bowl of a totally-enclosed continuous drum type filter 20, with or without provision for employing a precoat, although the latter is advantageous where the mixture of clay and oil being charged does not contain a diluent such as naphtha.

Surplus mixture may be recycled from the filter bowl through a pipe 21 to the vessel 16.

The oil is separated from the clay in the form of a filtrate which is discharged from the filter through a pipe 22 to a receiver 23. From the receiver 23 the filtrate passes through an exchanger 24, pipe 25, the exchanger 11 previously mentioned, and pipe 26 to a bank of coils 27 in the heater 6. From the coils 27 the heated filtrate passes through a pipe 28 to the upper portion of a stripper 29 wherein naphtha present in the mixture is distilled therefrom as a distillate. Steam may be introduced to the lower portion of the fractionator, as indicated. The distillate passes overhead to a condenser or exchanger 30 and the resulting condensate is received in a drum 31 wherein the naphtha and water separate into layers.

The naphtha layer is drawn off to a receiver 32 from which it is returned for reuse in the system. The water collecting in the receiver 31 may be withdrawn from the system through a gooseneck 33.

The stripped filtrate, comprising contacted oil, is drawn off from the bottom of the fractionator 29 by a pump 34 and delivered through a pipe 35 to the previously mentioned exchanger 24, from which point it passes through a cooler or exchanger 36, and from there it is withdrawn from the system.

The clay originally contained in the contacted oil is removed by the filter 20 in the form of a filter cake retaining around 40–60% of oil. Prior to discharge from the filter it is washed in situ with naphtha in the conventional fashion to remove retained oil, the resulting wash filtrate either being mixed with the main body of filtrate or separately disposed of in a somewhat similar manner.

The spent clay still retaining the coloring matter removed from the oil is discharged from the filter and mixed with the color-removal solvent in the tank 37.

This solvent comprises an oxygen-containing carbon compound, such as acetone, methyl ethyl ketone, or other low boiling ketone. It may also comprise a mixture of ketone and petroleum naphtha. A suitable mixture, for example, may contain around 10–30% by volume of ketone. The solvent is mixed with the clay in the tank 37 to form a mixture containing about 15–30% by weight of clay. The mixing is advantageously effected at a temperature above normal; for example, around 120–130° F.

The mixture of clay and solvent is drawn off by a pump 38 and delivered to a filter 39, which may be similar in type and operation to filter 20.

The coloring matter dissolved in the solvent and removed from the clay is discharged from the filter as a filtrate through a pipe 40 communicating with a receiver 41. From the receiver 41 the filtrate is passed through a pipe 42 to the previously mentioned exchanger 14, and from there it is passed through a bank of coils 43 in the heater 6. From the heating coils 43 the filtrate passes through pipe 44 to a stripping or fractionating column 45.

The solvent is removed as a distillate and, after cooling and condensation, is accumulated in a receiver 46 from which it is returned for reuse through a pipe 47 communicating with the previously mentioned tank 37.

The fractionator 45 is provided with a reboiler 48, by which means the heat necessary for stripping is supplied. The liquid accumulating in the bottom of the fractionator or in the reboiler 48 comprises the color bodies removed from the clay, together with some naphtha. This mixture is delivered by a pump 49 to the upper portion of a steam stripper 50 wherein the naphtha is stripped from the color bodies and is delivered as a distillate through a pipe 51 to the condenser 30 previously mentioned. The color bodies are withdrawn from the bottom of the steam stripper and may be disposed of as a gas oil, or in other ways.

Referring again to the filter 39, the filter cake comprising clay substantially free from color bodies is washed in situ with naphtha to remove retained ketone, and this wash filtrate may also be run to the receiver 41 or separately disposed of in a somewhat similar manner.

The washed clay cake is discharged from the filter 39 through a conduit 52 leading to a drier 53. A modified type of drier in which flue gas may be used, will be described more fully with reference to Fig. 2.

As illustrated in Fig. 1, the clay is forced through a horizontal tubular drier countercurrently to a stream of steam, such that the clay is subjected to a temperature in the range of about 275 to 400° F. The drier may be heated externally by the introduction of steam to the interior of a jacket surrounding the drier.

The dried clay is discharged from the dryer and conducted through a pipe 54 leading to the previously mentioned vessel 2.

The steam and solvent removed from the dryer 53 is conducted through a pipe 55 to a cooler and condenser 56. From there it is discharged into a separating vessel 57 wherein separation into layers occurs. The upper layer containing naphtha and solvent, is passed by a pump 58 through a pipe 59 to the previously mentioned accumulator 46. The bottom layer, comprising water and some solvent, is drawn off and may be subjected to separate fractionation to separate the acetone from the water.

As illustrated in Fig. 2, the clay dryer 53 is of the continuous type, which comprises a stationary horizontal pipe or conduit 60 having a screw or ribbon type conveyor 61 extending throughout its interior and adapted to force the clay entering from the pipe 52 through the tube 60 to the outlet 62 communicating with a dry clay receiver 63.

The conveyor 61 is rotated by a motor 64.

As indicated in Figure 3, the conveyor 61, of the ribbon type, has a series of horizontal bars 65 connecting adjacent elements of the ribbon so as to lift the clay from the bottom of the conveyor tube 60 and gradually spill the clay over the edge of the longitudinal bars as they rise, due to rotation of the conveyor.

The conveyor tube 60 is surrounded by an annular tube or pipe 66 so as to provide an annular heating space surrounding the tube 60. This annular space is supplied with hot flue gas through a pipe 67 leading from a suitable source of flue gas supply, such as a furnace or heater 68. The flue gas, after passing through the annular space, escapes through an outlet 69. If desired, all or a portion of the escaping flue gas may be introduced through a pipe 70 to the clay discharge end of the tube 60. This gas passes through the interior of the tube 60 countercurrently to the clay and has the effect of decreasing the partial pressure of the solvent being removed from the clay.

The gas and solvent leave the conveyor tube 60 through a pipe 71 communicating with the suction of a blower 72. The blower 72 is operated so as to maintain a relatively low rate of gas flow through the tube 60, thereby avoiding the entrainment of excessive amounts of clay in dust form. The blower 72 discharges into a dust separator 73 wherein the small amount of entrained clay dust is recovered, or, being the most finely divided portion of the clay, may be continuously removed from the system.

The gases and vapors leave the separator 73 through a pipe 74 and pass through a condenser 75 wherein naphtha or other solvent present in the gases is condensed. The resulting condensate accumulates in the bottom of a vessel 76 from which it is withdrawn through a pipe 79 for reuse.

The remaining fixed gases accumulating in the upper portion of the vessel 76 are drawn off through a heater 77, and from there returned through a pipe 70 to the tube 60 for reuse.

Obviously many modifications and variations of the invention, as hereinbefore set forth, may be made without departing from the spirit and scope thereof, and therefore only such limitations should be imposed as are indicated in the appended claim.

I claim:

In a continuous process for reconditioning spent clay used for decolorizing hydrocarbon oils and which contains coloring matter, as well as some oil, the steps comprising washing the clay with naphtha to remove retained oil, mixing the deoiled clay with a substantial volume of color-removal solvent, passing the mixture to a continuous rotary filter, forming a filtrate of solvent and dissolved coloring matter and a filter cake of decolorized clay, removing the filtrate, washing the filter cake in situ with naphtha to remove retained solvent, passing the washed cake, comprising decolorized clay from the filter to the inlet of an externally heated tubular dryer, propelling the clay through the dryer in a thinly disposed mass with repeated spilling through space, maintaining the clay within the dryer at a temperature in the range about 275–400° F., removing the clay from the outlet end of said dryer reconditioned for mixing with fresh feed oil, introducing heated inert gas near the clay outlet end of said dryer, forcing the gas through the dryer at a relatively low rate of flow countercurrently to the moving clay, exhausting the gas and naphtha expelled from the clay from the clay outlet end of said dryer, passing the exhaust vapors through a dust separator to remove entrained clay particles, thereafter cooling the vapors to condense entrained solvent, removing the condensate, heating the uncondensed gas and returning the heated gas to the clay outlet end of said dryer.

WYNKOOP KIERSTED, Jr.